(12) United States Patent
Bancel et al.

(10) Patent No.: US 7,934,265 B2
(45) Date of Patent: Apr. 26, 2011

(54) SECURED COPROCESSOR COMPRISING MEANS FOR PREVENTING ACCESS TO A UNIT OF THE COPROCESSOR

(75) Inventors: Frédéric Bancel, Lamanon (FR);
Nicolas Berard, Trets (FR)

(73) Assignee: STMicroelectronics SA, Montrouge (FR)

( * ) Notice: Subject to any disclaimer, the term of this patent is extended or adjusted under 35 U.S.C. 154(b) by 1421 days.

(21) Appl. No.: 11/398,857

(22) Filed: Apr. 5, 2006

(65) Prior Publication Data

US 2006/0265570 A1    Nov. 23, 2006

(30) Foreign Application Priority Data

Apr. 5, 2005   (FR) ...................................... 05 03329

(51) Int. Cl.
*G06F 7/04* (2006.01)
*G06F 12/14* (2006.01)

(52) U.S. Cl. .................... 726/27; 726/2; 726/9; 726/20; 726/22; 726/26; 726/30; 726/34; 726/35; 713/50; 713/51; 713/165; 713/172; 713/187; 713/189; 713/193; 713/194; 713/400; 714/12; 714/36; 714/41; 714/48; 714/49; 714/52

(58) Field of Classification Search .................. 726/22, 726/26–27, 34; 713/193–194
See application file for complete search history.

(56) References Cited

U.S. PATENT DOCUMENTS

| | | | |
|---|---|---|---|
| 4,760,575 A * | 7/1988 | Watanabe ..................... 714/719 |
| 4,996,691 A | 2/1991 | Wilcox et al. | |
| 5,184,032 A | 2/1993 | Leach | |
| 5,357,146 A | 10/1994 | Heimann | |
| 5,659,678 A * | 8/1997 | Aichelmann et al. ........... 714/25 |
| 5,694,402 A | 12/1997 | Butler et al. | |
| 5,949,798 A * | 9/1999 | Sakaguchi ..................... 714/738 |
| 5,974,529 A | 10/1999 | Zumkehr et al. ................ 712/41 |
| 6,205,559 B1 | 3/2001 | Sakaguchi | |
| 6,357,024 B1 * | 3/2002 | Dutton et al. ................... 714/45 |
| 6,424,926 B1 | 7/2002 | Mak | |
| 6,457,145 B1 * | 9/2002 | Holmberg et al. .............. 714/45 |
| 6,549,022 B1 * | 4/2003 | Cole et al. ..................... 324/752 |
| 6,601,008 B1 | 7/2003 | Madge | |
| 6,654,465 B2 | 11/2003 | Ober et al. | |
| 6,714,032 B1 * | 3/2004 | Reynick ........................ 324/765 |
| 6,751,749 B2 * | 6/2004 | Hofstee et al. .................. 714/11 |
| 6,766,485 B1 * | 7/2004 | Sakaguchi ..................... 714/724 |
| 7,168,065 B1 | 1/2007 | Naccache et al. | |

(Continued)

FOREIGN PATENT DOCUMENTS

FR   2 746 199    9/1997

(Continued)

*Primary Examiner* — Christian LaForgia
*Assistant Examiner* — Jenise E Jackson
(74) *Attorney, Agent, or Firm* — Lisa K. Jorgenson; Joshua A. Kading; Seed IP Law Group PLLC

(57) ABSTRACT

The present invention relates to a coprocessor comprising a calculation unit for executing a command, and a securization device for monitoring the execution of the command and supplying an error signal having an active value as soon as the execution of the command begins and an inactive value at the end of the execution of the command, if no abnormal progress in the execution of the command has been detected. The coprocessor further comprises means for preventing access to at least one unit of the coprocessor, while the error signal is on the active value. Application is provided particularly but not exclusively to the protection of integrated circuits for smart cards against attacks by fault injection.

29 Claims, 2 Drawing Sheets

U.S. PATENT DOCUMENTS

| | | | |
|---|---|---|---|
| 2002/0133773 A1 | 9/2002 | Richter et al. | 714/733 |
| 2003/0085621 A1 | 5/2003 | Potega | |
| 2003/0204801 A1 | 10/2003 | Tkacik et al. | 714/726 |
| 2003/0226082 A1 | 12/2003 | Kim et al. | |
| 2004/0139346 A1 | 7/2004 | Watt et al. | 713/200 |
| 2005/0273848 A1* | 12/2005 | Charles et al. | 726/11 |
| 2006/0267653 A1 | 11/2006 | Fulkerson | |

FOREIGN PATENT DOCUMENTS

| | | |
|---|---|---|
| JP | 10-91531 | 4/1998 |

* cited by examiner

SECURED COPROCESSOR COMPRISING MEANS FOR PREVENTING ACCESS TO A UNIT OF THE COPROCESSOR

TECHNICAL FIELD

The present disclosure generally relates to the protection of integrated circuits, such as integrated circuits for smart cards, against attacks by error injection.

The present disclosure relates more particularly but not exclusively to a method for monitoring the execution by a coprocessor of commands sent in particular by a microprocessor, as well as an integrated circuit comprising a coprocessor comprising means for monitoring the execution of commands.

BACKGROUND INFORMATION

A coprocessor is a specific component designed to perform calculations particularly to offload the microprocessor to which it is coupled. It is generally driven by the microprocessor which communicates with it through registers to load calculation data, to configure it and finally to retrieve the results of the calculations and to be informed of the end of the calculations. A coprocessor generally comprises a control block comprising an interface with the data bus of the microprocessor and a state machine pacing the progress of the calculations, and a calculation unit controlled by the control block (also called "data path").

In secured integrated circuits, such as those designed for smart cards, coprocessors are particularly used to perform cryptographic calculations, and thus handle secret keys. These coprocessors are therefore the targets of attacks aiming to discover these keys.

In recent years, the techniques of hacking secured microprocessor integrated circuits (e.g., microprocessors, microcontrollers, microprocessor memories, coprocessors, etc.) have developed considerably. The most advanced hacking methods currently involve injecting errors at determined points of an integrated circuit during the execution of so-called sensitive operations, such as authentication operations or operations of executing a cryptography algorithm for example. Such attacks by error injection, also referred to as attacks by fault injection, enable, in combination with mathematical models, the structure of a cryptography algorithm and/or the secret keys it uses to be deduced. The fault injection can be done in various ways, by introducing glitches into the supply voltage of the integrated circuit, by introducing glitches into the clock signal of the integrated circuit, by exposing the integrated circuit to radiations, etc.

Thus, the detection of error injections is considered one important measure to guarantee a high level of security to certain integrated circuits, particularly integrated circuits for smart cards.

A method for monitoring the execution of a program is already known, particularly through EP 1,161,725, which involves producing cumulative signatures that vary according to the codes-instructions that run in the instruction register of a microprocessor. Such a method enables a derailment of the program being executed, particularly due to an error injection, to be detected.

However, one type of attack against which a microprocessor integrated circuit must be protected is the injection of errors into the data supplied to a peripheral element, particularly a cryptographic coprocessor (which is generally integrated onto the same silicon chip as the microprocessor). Now, the monitoring of a derailment during the execution of a program by a microprocessor does not enable an attack on the related coprocessor to be detected, due to the fact that the latter processes each command sent by the microprocessor without interacting with the microprocessor before the end of the processing.

Techniques for detecting an attack on a coprocessor do exist. One of these techniques involves running several times the calculation to be performed corresponding to the command received, then comparing the results obtained. If these results are identical, it can be deduced that no attack has occurred. In this way, to make a successful attack, the error injection must be repeated several times, and in an identical manner in terms of its effects and temporal aspects. This technique multiplies the calculation times by the number of iterations, which is a major disadvantage. Further, if an error is highlighted in connection with the state of a state machine, the injection of a fault can result in skipping a state, and thus in masking the error.

Another technique involves providing an additional fault injection detection logic circuit. Regarding the calculation unit that has no deterministic properties since the data processed are not predictable, redundant data paths are provided and the identity of the signals in the redundant paths is compared on the fly. The detection of a difference between two redundant signals triggers the activation of an error signal. Regarding the control block which has a deterministic aspect, a signature circuit is used which calculates a signature, throughout the operation performed by the coprocessor, using certain control signals controlling the calculation unit. At the end of the calculation, the calculated signature is compared with an expected value and, if a difference is detected, revealing a fault injection, an alert signal is activated. Now, the comparison, whether performed by software or by a circuit, can be bypassed by an appropriate fault injection. This technique thus has a flaw.

BRIEF SUMMARY OF THE INVENTION

Embodiments of the present invention aim to overcome these disadvantages.

Therefore, a first embodiment of the present invention puts the coprocessor into an error mode by default as soon as the execution of a command begins, and maintains the error mode while the smooth execution of the command is not confirmed, including when the execution of the command is finished if it has not taken place as expected.

Another embodiment of the present invention prevents access to certain units of the coprocessor while the error mode is present. An embodiment of the present invention is indeed based on the observation that a voluntary fault injection is generally accompanied by access to "sensitive" units of the coprocessor, such as an output register for example, which enables the fraudor to observe the effects of the fault injection and to deduce information about the coprocessor or secret data it uses therefrom.

Thus, blocking access to "sensitive" units of the coprocessor, combined with the fact of putting it into an error mode by default which can only be lifted if the command has been correctly executed, provides a high level of security.

More particularly, one embodiment of the present invention provides a method for monitoring the execution of a command by a coprocessor, comprising:

producing, at the start of the execution of the command, an error signal having an active value, during the execution of the command, monitoring the operation of the coprocessor so as to detect any abnormal progress in the execution of the command, at the end of the execution of the command, taking the error signal to an inactive value unless any abnormal progress in the execution of the command has been detected, and preventing access to at least one unit to be protected of the coprocessor, while the error signal is on an active value.

According to one embodiment, the unit to be protected comprises at least one register of the coprocessor.

According to one embodiment, the register is read protected.

According to one embodiment, the register is read protected by supplying the output of the register with dummy binary data bearing no relation to the content of the register, in response to a request to read the register.

According to one embodiment, the method comprises producing, in synchronization with a clock signal, current cumulative signatures, each current cumulative signature varying according to a previous cumulative signature and to deterministic logic signals taken off in the coprocessor, until a final cumulative signature is obtained at the end of the execution of the command, and maintaining the error signal on the active value when the cumulative signature is different from an expected signature.

According to one embodiment, the production of the signatures is paced by a clock signal of the coprocessor, one current cumulative signature being produced at each clock cycle during the execution of the command.

According to one embodiment, the deterministic logic signals comprise control signals produced by a control unit of the coprocessor.

According to one embodiment, the cumulative signatures are calculated by a linear feedback shift register.

According to one embodiment, the expected signature is read in a dedicated register of the coprocessor.

According to one embodiment, the expected signature is selected from a plurality of expected signatures each corresponding to a command executable by the coprocessor.

An embodiment of the present invention also relates to a coprocessor comprising a calculation unit for executing a command, a securisation device for monitoring the execution of the command and producing an error signal having an active value as soon as the execution of the command begins, and an inactive value at the end of the execution of the command unless any abnormal progress in the execution of the command has been detected, and protection means for preventing access to at least one unit to be protected of the coprocessor, while the error signal is on the active value.

According to one embodiment, the protection means are arranged for preventing access to at least one register of the coprocessor.

According to one embodiment, the protection means are arranged for preventing read access to at least one register of the coprocessor.

According to one embodiment, the protection means comprise means for supplying the output of the register with dummy binary data bearing no relation to the content of the register, in response to a request to read the register.

According to one embodiment, the securisation device comprises a signature calculation circuit receiving at input deterministic logic signals taken off in the coprocessor and producing a current cumulative signature according to the deterministic logic signals and to a previous cumulative signature, until a final cumulative signature is obtained at the end of the execution of the command, and comparison means for comparing the current cumulative signature and an expected signature, taking the error signal to the active value when the current cumulative signature is different from the expected signature.

According to one embodiment, the coprocessor comprises a control unit producing the control signals, and the deterministic logic signals comprise control signals produced by the control unit.

According to one embodiment, the signature calculation circuit is paced by a clock signal and calculates a current cumulative signature at each clock cycle.

According to one embodiment, the signature calculation circuit comprises a linear feedback shift register.

According to one embodiment, the coprocessor comprises a dedicated register for storing the expected signature.

According to one embodiment, the coprocessor comprises means for selecting the expected signature from a plurality of pre-recorded expected signatures each corresponding to a command executable by the coprocessor.

BRIEF DESCRIPTION OF THE SEVERAL VIEWS OF THE DRAWINGS

These and other features of the present invention will be explained in greater detail in the following description of one or more examples of a coprocessor according to various embodiments of the present invention, given in relation with, but not limited to the following figures.

DETAILED DESCRIPTION

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
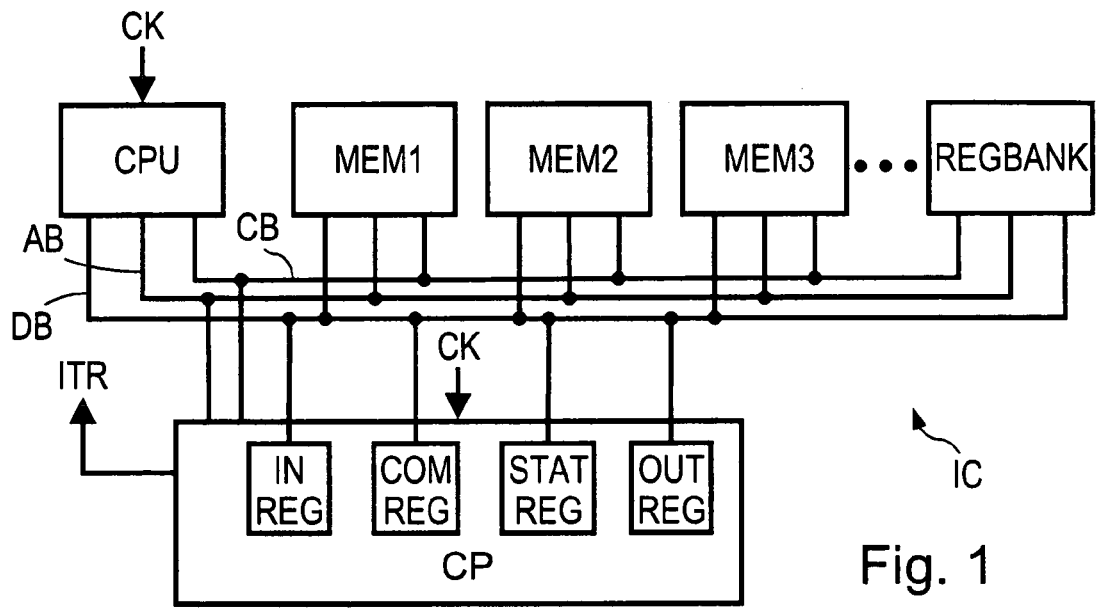
FIG. 1 schematically represents one example architecture of a microprocessor integrated circuit comprising a coprocessor.

FIG. 1 represents one example architecture of an integrated circuit IC of the microprocessor or microcontroller type. The integrated circuit IC classically comprises a central processing unit CPU and peripheral elements of the CPU, here memories MEM1, MEM2, MEM3, a register bank REGBANK, and a coprocessor CP, dedicated for example to cryptographic calculation. The memory MEM1 is for example a non-volatile memory of ROM type (read-only memory), the memory MEM2 is an electrically erasable and programmable memory of EEPROM type, and the memory MEM3 a volatile memory of RAM type.

The peripheral elements are linked to the CPU by a data bus DB, an address bus AB and a control bus CB. "Control bus" can include a set of wires conveying selection or information signals sent by the CPU to the peripheral elements, or vice-versa. The bus CB particularly conveys a read or write signal RW and a signal FETCH sent by the CPU during the reading of a code-instruction in one of the program memories.

The coprocessor CP comprises several registers linked to the data bus DB, here input INREG and output OUTREG registers enabling data to be exchanged with the CPU, a register COMREG enabling a command to be executed to be received from the CPU, and a state register STATREG supplying information about the state of the coprocessor. The register STATREG comprises a bit RB (Ready/Busy) enabling the CPU to determine whether the coprocessor is busy or ready to receive a new command to be executed, and a bit RUN enabling the CPU to start the execution of a command once the code of the command has been written in the register COMREG. To start the execution of a command loaded into the register COMREG, the coprocessor positions the bit RUN to a determined logic value. When the processing of the command is finished, the coprocessor positions the bit RB to the "ready" logic state and resets the bit RUN. By monitoring the state of the bit RB, periodically for example, the CPU can determine when the coprocessor has finished the execution of the command. Alternatively, the coprocessor can be designed to send an interrupt signal ITR when it has finished processing the command, this signal being applied to an interrupt input of the CPU.

Figure 2:
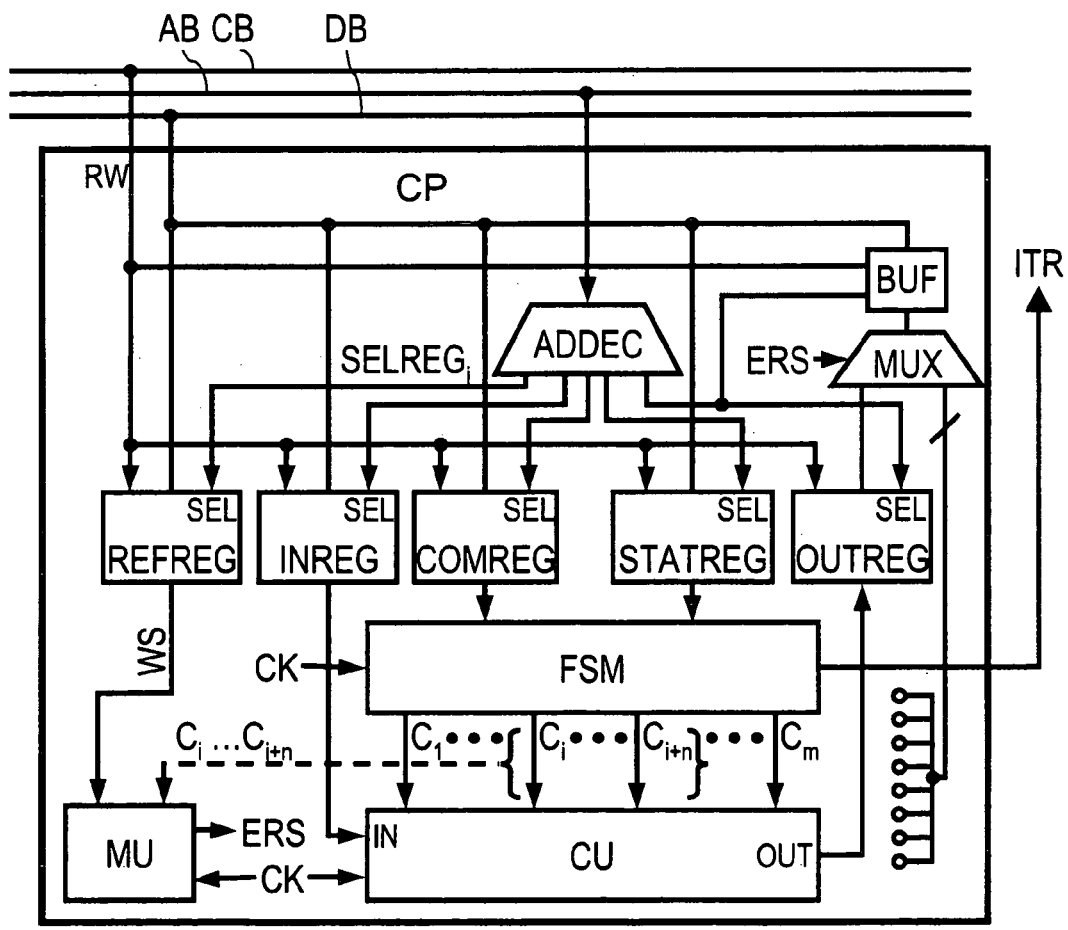
FIG. 2 is a more detailed view, in the form of a block diagram of an example coprocessor comprising a securisation device according to an embodiment of the present invention.

As represented in FIG. 2, one embodiment of the coprocessor CP comprises an address decoder ADDEC linked to the address bus AB and supplying selection signals SELREGi for selecting a register according to the address sent on the bus AB, each of these signals being applied to a selection input SEL of one of the registers INREG, COMREG, STATREG, OUTREG. The signal RW is also applied to the registers, to select a read or write access mode.

The coprocessor CP also comprises a calculation unit CU driven by a control block FSM. The latter is produced here in the form of a finite state machine paced by a clock signal, such as the clock signal CK of the CPU for example, and is designed to determine a current state according to a previous state and to input signals proceeding for example from the registers COMREG and STATREG. A set of control signals $C_1$ to $C_m$ supplied by the control block FSM corresponds to each state of the control block FSM, these control signals being applied in whole or part to the calculation unit CU.

The calculation unit CU processes input data proceeding from the input register INREG according to the control signals $C_1$ to $C_m$, and delivers output data that are written in registers of the coprocessor such as the output register OUTREG for example. At the end of the calculation corresponding to the processing of the command supplied by the CPU in the register COMREG, the control block FSM can deliver the interrupt signal ITR to inform the CPU that the processing is finished.

The coprocessor CP also comprises a securisation device MU according to one embodiment of the present invention, which monitors the operation of the coprocessor during the execution of a command, so as to detect any abnormal progress in the execution of the command, due in particular to an error injection. To this end, the device MU uses for example deterministic signals $C_i$ to $C_{i+n}$ taken off from the control signals $C_1$ to $C_m$ supplied by the control block FSM. These signals are deterministic (predictable) in that they only depend on the command being executed by the coprocessor, and thus enable the smooth execution of the command to be monitored.

To avoid the information concerning the detection of an attack being masked by a fault injection, the device MU activates an internal error signal ERS as soon as the execution of the command begins, and deactivates it at the end of the processing of the command, unless any abnormal progress in the execution of the command has been detected.

The coprocessor CP also comprises means for preventing access to certain units to be protected while the error signal ERS is active. Access to these units is therefore only possible when the error signal has been deactivated, e.g., at the end of the processing of the command if such processing has taken place normally.

As an example, the unit to be protected is here the output register OUTREG. More particularly, the register OUTREG is here read protected and this protection is obtained here by providing a scrambling of the data it supplies in response to a read request (resulting in the appearance of the address of this register on the data bus, the activation of the signal SELREGi corresponding to this register by the decoder ADDEC and the fact that the signal RW is on or changes to the "read" value on the control bus).

To this end, the coprocessor comprises a multiplexer MUX receiving the output of the register OUTREG at one input and at another input dummy binary data bearing no relation to the content of the register, such as random data for example or signals taken off in the coprocessor. The output of the multiplexer is linked to the data bus DB. The multiplexer receives at a selection input the error signal ERS produced by the securisation device MU, and its output supplies the dummy binary data if the error signal ERS is on the active value or the content of the register if the error signal ERS is on the inactive value.

Thus, while the execution of the command is not finished or if a fault is detected in the processing of the command, the error signal ERS is activated and the multiplexer MUX, in response to the register OUTREG being read selected, supplies the dummy data on the bus BD instead of the data present in the register OUTREG.

So as not to permanently apply the dummy data on the bus when the signal ERS is active, a buffer circuit BUF is arranged between the output of the multiplexer MUX and the data bus DB. The circuit BUF receives at a command input the selection signal SELREGi corresponding to the register OUTREG and the signal RW. The output of the circuit BUF is by default in a high impedance state and becomes transparent relative to the input of the circuit BUF when the register OUTREG is read selected, to connect the output of the multiplexer MUX to the bus DB.

Similarly, the outputs of the registers are by default in the high impedance state, while the registers are not read selected.

If several registers must be read protected, the output of each register to be protected is equipped with a multiplexer and a buffer circuit like the ones described above. These protection elements can also be integrated into the registers themselves, a classical register structure generally comprising a buffer-type or latch-type output stage. A multiplexer or any other means of scrambling data can thus be arranged before this output stage.

It shall be noted that if the CPU must monitor the end of the processing performed by the coprocessor by periodically reading the state register STATREG, this register must not be read protected.

Figure 3:
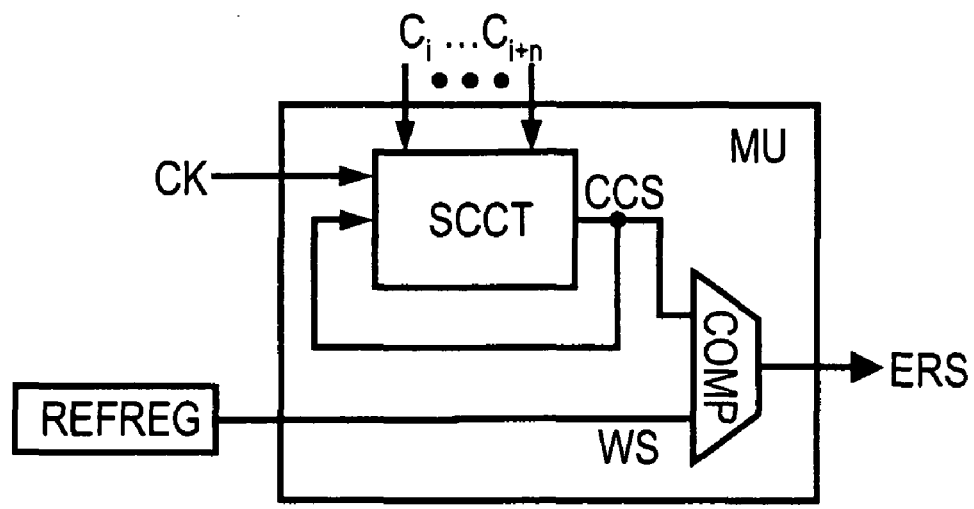
FIG. 3 represents an example of an embodiment of the securisation device.

FIG. 3 represents an example of an embodiment of the securisation device MU.

The device MU comprises a hard-wired logic signature calculation circuit SCCT comprising parallel inputs receiving the deterministic signals $C_i$ to $C_{i+n}$, and an output supplying a current signature CCS. The signature CCS is sent back to an input of the circuit SCCT for the latter to calculate, at the pace of a clock signal CK which can be the clock signal of the CPU, a next cumulative signature that replaces the current cumulative signature at each new cycle of the clock signal.

The current signature CCS is applied to an input of a comparator COMP the other input of which receives an expected signature WS, supplied here by a dedicated register REFREG of the coprocessor (FIGS. 2 and 3). The expected signature WS is for example written in the register REFREG by the CPU after the latter has loaded the command to be executed into the register COMREG and before it positions the flag RUN in the register STATREG. Alternatively, the coprocessor is equipped with a table or a bank of registers comprising a plurality of expected signatures, each one varying according to a command in a set of commands of the coprocessor, and the expected signature WS is selected by the coprocessor or the device MU according to the command received, before starting to execute the command.

The comparator COMP comprises an inverting output that delivers the internal error signal ERS. This is here equal to "1" (active value) while the current signature CCS is different from the expected signature WS.

Thus, while the processing of the command is not finished, the calculated signature is different from the expected value and the error signal ERS is on "1". Any attempt to read the register OUTREG results in the dummy data being supplied on the data bus, while the execution of the command is not finished (because the expected signature is not yet obtained) or even after the processing of the command if this processing has not taken place as expected (the expected signature thus never being obtained).

Figure 4:
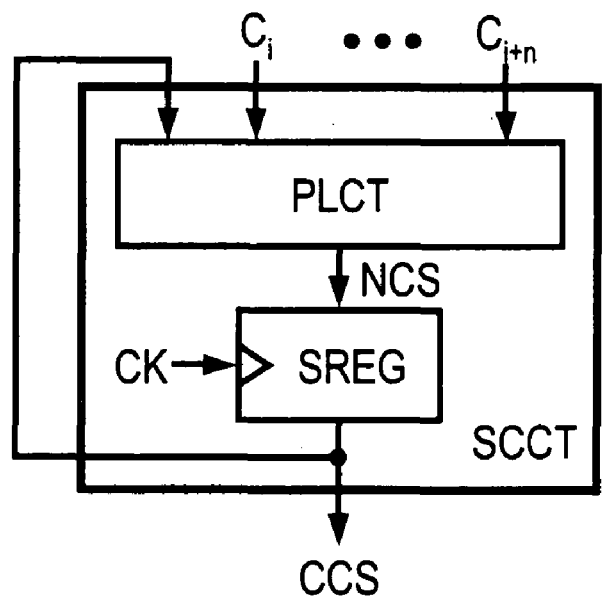
FIG. 4 represents an embodiment of an element of the securisation device in greater detail.

FIG. 4 shows an example of an embodiment of the circuit SCCT in the form of a linear feedback shift register LFSR. The circuit SCCT comprises a logic circuit PLCT and a signature register SREG with parallel input and output. The circuit PLCT executes a signature function Fs and comprises inputs receiving the control signals $C_i$ to $C_{i+n}$ applied at input of the securisation device MU, as well as an input receiving a current cumulative signature CCS. The output of the circuit PLCT supplies to the input of the register SREG a next cumulative signature NCS that varies according to the current cumulative signature CCS and to the signals applied to its others inputs, e.g.:

$$NCS = Fs(CCS, C_i, \ldots, C_{i+n}) \quad (1)$$

Upon each new clock cycle CK, the register SREG copies to its output the signature present at its input, such that the next signature supplied by the circuit PLCT during the previous clock cycle becomes the current signature, and the current signature of the previous clock cycle becomes the previous signature PCS, e.g.:

$$CCS = Fs(PCS, C_i, \ldots, C_{i+n}) \quad (2)$$

the relation (2) being equivalent to the relation (1) seen from the output of the register SREG.

For the sake of simplicity, various signals that can easily be provided by those skilled in the art have not been described above, only the signals required to understand embodiments of the present invention having been mentioned.

It will be understood by those skilled in the art that various alternative embodiments and improvements of the present invention are possible.

Generally speaking, those skilled in the art will be able to provide other embodiments of a securisation device enabling the integrated circuit to be taken by default into an error mode during the execution of a command by the coprocessor, and access to units of the coprocessor to be prevented while the circuit is in error mode.

Furthermore, although the securisation device MU was described above as an element distinct from the control block FSM, it can be integrated into the control block and additional capabilities relating to security can be provided.

In particular, in one embodiment, the block FSM is arranged for verifying that the internal error signal ERS is on the active value before initiating the execution of a command. If that is not the case, the block FSM forces the external error signal ERS to the active value and can put itself into a determined state that it can only leave after the coprocessor has been completely reset.

Furthermore, it goes without saying that the logic values described above corresponding to the active state of the signals only have a relative value.

The smooth execution of the command can furthermore be monitored in several ways, for example by applying control techniques mentioned in the preamble, based on a redundancy of the data paths present in the calculation unit of the coprocessor, or by combining such techniques with the one based on producing signatures varying according to deterministic signals.

Finally, the notion of coprocessor within the meaning of the present invention must be understood in a non-limitative manner. Generally speaking, a non-limiting example of a coprocessor within the meaning of the present invention is a hard-wired logic circuit provided for executing specific operations in response to a command supplied to it. Thus, it is possible for example to secure by one or more embodiments of the present invention hard-wired logic circuits controlling data or address buses in microprocessors or microcontrollers uior which control access to memories, and which comprise "sensitive" units that are to be protected against intrusions at least during the execution of certain operations triggered by specific commands.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for monitoring an execution of a command by a coprocessor, the method comprising:
producing, at a start of the execution of the command, an error signal having an active value;
during the execution of the command, monitoring operation of the coprocessor so as to detect any abnormal progress in the execution of the command;
at an end of the execution of the command, taking the error signal to an inactive value unless any abnormal progress in the execution of the command has been detected; and
preventing access to at least one unit to be protected of the coprocessor, while the error signal is on the active value.

2. The method according to claim 1 wherein the unit to be protected comprises at least one register of the coprocessor.

3. The method according to claim 2 wherein the register is read protected.

4. The method according to claim 3 wherein the register is read protected by supplying an output of the register with dummy binary data bearing no relation to content of the register, in response to a request to read the register.

5. The method according to claim 1, further comprising:
producing, in synchronization with a clock signal, current cumulative signatures, each current cumulative signature varying according to a previous cumulative signature and to deterministic logic signals, until a final cumulative signature is obtained at the end of the execution of the command; and
maintaining the error signal on the active value if the cumulative signature is different from an expected signature.

6. The method according to claim 5 wherein production of the signatures is paced by a clock signal of the coprocessor, one current cumulative signature being produced at each clock cycle during the execution of the command.

7. The method according to claim 5 wherein the deterministic logic signals comprise control signals produced by a control unit of the coprocessor.

8. The method according to claim 5 wherein the cumulative signatures are calculated by a linear feedback shift register.

9. The method according to claim 5 wherein the expected signature is read in a dedicated register of the coprocessor.

10. The method according to claim 5 wherein the expected signature is selected from a plurality of expected signatures each corresponding to a command executable by the coprocessor.

11. A coprocessor having a calculation unit for executing a command, the coprocessor comprising:
a securization device for monitoring an execution of the command and for producing an error signal having an active value at a beginning of the execution of the command, and having an inactive value at an end of the execution of the command unless any abnormal progress in the execution of the command has been detected; and
protection means for preventing access to at least one unit to be protected of the coprocessor, while the error signal is on the active value.

12. The coprocessor according to claim 11 wherein the protection means are arranged for preventing access to at least one register of the coprocessor.

13. The coprocessor according to claim 11 wherein the protection means are arranged for preventing read access to at least one register of the coprocessor.

14. The coprocessor according to claim 12 wherein the protection means comprise means for supplying an output of the register with dummy binary data bearing no relation to content of the register, in response to a request to read the register.

15. The coprocessor according to claim 11 wherein the securitization device comprises:
a signature calculation circuit receiving at input deterministic logic signals and producing a current cumulative signature according to the deterministic logic signals and to a previous cumulative signature, until a final cumulative signature is obtained at the end of the execution of the command; and
comparison means for comparing the current cumulative signature and an expected signature, taking the error signal to the active value if the current cumulative signature is different from the expected signature.

16. The coprocessor according to claim 15, further comprising a control unit producing the control signals, and wherein the deterministic logic signals comprise control signals produced by the control unit.

17. The coprocessor according to claim 15 wherein the signature calculation circuit is paced by a clock signal and calculates a current cumulative signature at each clock cycle.

18. The coprocessor according to claim 15 wherein the signature calculation circuit comprises a linear feedback shift register.

19. The coprocessor according to claim 15, further comprising a dedicated register for storing the expected signature.

20. The coprocessor according to claim 15, further comprising means for selecting the expected signature from a plurality of pre-recorded expected signatures each corresponding to a command executable by the coprocessor.

21. An apparatus having a coprocessor, the apparatus comprising:
a calculation unit to execute a command;
a device operatively coupled to the calculation unit to monitor execution of the command and to produce an error signal having an active value at a beginning of the execution of the command, the error signal having an inactive value at an end of the execution of the command unless an abnormal progress in the execution of the command has been detected; and
protection circuitry coupled to the device to prevent access to at least one unit to be protected of the coprocessor, if the error signal has the active value.

22. The apparatus of claim 21 wherein the unit to be protected includes a register of the coprocessor, the protection circuitry being coupled to prevent read access to the register if the error signal has the active value.

23. The apparatus of claim 22 wherein the protection circuitry includes:
a multiplexer coupled to a bus to supply dummy data to the bus instead of data present in the register if the error signal has the active value; and
a buffer, coupled between the multiplexer and the bus, that can be selectively controlled to provide the data present in the register to the bus if the error signal has the inactive value and to provide the dummy data from the multiplexer to the bus if the error signal has the active value.

24. The apparatus of claim 21 wherein the device includes:
a signature calculation circuit to receive input logic signals and to produce a current cumulative signature based on the logic signals and on a previous cumulative signature, until a final cumulative signature is obtained at the end of the execution of the command; and
a comparison circuit coupled to the signature calculation circuit to compare the current cumulative signature with a reference signature, the comparison circuit being coupled to provide the error signal with the active value if the current cumulative signature is different from the reference signature.

25. A system, comprising: a processor; a bus coupled to the processor; and a coprocessor coupled to the processor through the bus, the coprocessor including: a calculation unit to execute a command; a device operatively coupled to the calculation unit to monitor execution of the command and to produce an error signal having an active value at a beginning of the execution of the command, and having an inactive value at the end of the execution of the command unless an abnormal condition associated with the execution of the command has been detected; and protection circuitry coupled to the device to prevent access to at least one unit to be protected of the coprocessor, if the error signal has the active value.

26. The system of claim 25 wherein the processor and coprocessor comprise part of a smart card device.

27. The system of claim 25 wherein the protection circuitry includes:
- a first circuit coupled to the bus to supply dummy data to the bus instead of register data if the error signal has a first value; and
- a second circuit, coupled between the first circuit and the bus, that can be selectively controlled to provide the register data to the bus if the error signal has a second value and to provide the dummy data from the first circuit to the bus if the error signal has the first value.

28. The system of claim 25 wherein the device includes:
- a first circuit block to receive input logic signals and to produce a current cumulative signature based on the logic signals and on a previous cumulative signature, until a final cumulative signature is obtained at the end of the execution of the command; and
- a second circuit block coupled to the first circuit block to compare the current cumulative signature with a reference signature, the second circuit block being coupled to provide the error signal with a value indicative of the abnormal condition if the current cumulative signature is different from the reference signature.

29. The system of claim 25, the at least one unit to be protected of the coprocessor is at least a register.

* * * * *